May 13, 1969 F. K. BECKER 3,444,482

ADJUSTABLE DELAY LINE FILTER HAVING PLURALITY OF BINARILY WEIGHTED SEGMENTS AFFIXED TO A BODY OF PIEZOELECTRIC MATERIAL

Filed May 1, 1967

INVENTOR
F. K. BECKER
BY
J. P. Kearns
ATTORNEY

United States Patent Office 3,444,482

Patented May 13, 1969

3,444,482

ADJUSTABLE DELAY LINE FILTER HAVING PLURALITY OF BINARILY WEIGHTED SEGMENTS AFFIXED TO A BODY OF PIEZOELECTRIC MATERIAL

Floyd K. Becker, Colts Neck, N.J., assignor to Bell Telephone Laboratories, Incorporated, Berkeley Heights, N.J., a corporation of New York Filed May 1, 1967, Ser. No. 635,048

Int. Cl. H04b *3/04;* H02n *1/00*

U.S. Cl. 333—18 9 Claims

ABSTRACT OF THE DISCLOSURE

A longitudinally excited acoustic delay line provided with transverse piezoelectric receivers has these receivers divided into binarily weighted segments. Selective connection of certain of these segments to a common output imparts to the delay line of fixed, but arbitrarily chosen, response characteristic. A desired response characteristic results from selection of appropriate segments by automatic transversal equalizer techniques involving a comparison of the responses of the delay line and a reference filter to identical test pulses.

*Field of the invention*

This invention relates generally to acoustic, distributed-constant and lumped-constant delay lines and specifically to the automatic adjustment of such lines to fashion networks of arbitrary response.

*Background of the invention*

Time-domain or transversal filter equalizers have been proposed which generate impulse responses of arbitrary characteristic. The general transversal equalizer comprises a lumped constant delay line portion with evenly spaced taps, individual attenuators having a range of adjustment between plus and minus unity gain connected to each tap and a summation circuit for combining the attenuated tap outputs at a common point. When these attenuators are appropriately adjusted, the summed output responsive to an input impulse can be made to assume any desired arbitrary impulse response within the range of the number of taps provided. Recently it has been discovered that an arbitrary frequency response characteristic can be generated by time domain techniques if the tap spacing on the delay-line portion of a transversal equalizer is established as the reciprocal of twice the highest frequency to be transmitted. Furthermore, such an arbitrary frequency response can be set by adjusting the tap attenuators according to a correlation of each tap output with the difference between the response of the transversal filter and an ideal filter to be matched to identical input signals. The input signals may be either impulses or pseudo-random waves.

*Description of the prior art*

In the copending patent application of R. W. Lucky, Ser. No. 472,146 filed July 15, 1965, now U.S. Patent No. 3,375,473 granted Mar. 26, 1968, and entitled, "Automatic Equalizer for Analog Channels Having Means for Comparing Two Test Pulses One Pulse Traversing the Transmission Channel and Equalizer," basic principles for automatically adjusting the attenuators in a transversal filter equalizer in accordance with the differences in impulse response of an actual transmission channel and an ideal transmission channel to identical test pulses are disclosed. In accordance with these principles the differences in response between the actual and ideal channels to these pulses are correlated in product modulators with the outputs of each tap on the transversal filter. The resultant products are either positive or negative. The polarities of these products then advance or retard the associated attenuators by incremental steps in a direction to reduce the magnitude of the differences in responses. Repeated responses to a train of impulses eventually reduce the difference signal to a minimum value consistent with the size of the incremental step. Then the transversal filter in combination with the transmission channel will exhibit substantially the same frequency-time response as the ideal channel.

Several forms of tapped acoustic delay lines including those with ultrasonic properties have been available in the art as a means for deriving a plurality of time related output pulses from a single input pulse. These tapped delay lines generally comprise separate acoustic transducers or receivers of suitable design spaced along an acoustic delay medium. Both piezoelectric and magnetostrictive transducers in either compressive, shear or torsional modes have been used. It has further been recognized that tapped monolithic delay lines have the potential for producing arbitrary time versus frequency modifications of an acoustic wave and serving as frequency-selective transmission systems.

In U.S. Patent No. 3,289,114 issued to J. H. Rowen on Nov. 29, 1966, an exemplary ultrasonic delay line with separate transducer taps is disclosed. This delay line employs a rectangular cross-sectional bar of ultrasonic propagation material with an input wave-launching means and a plurality of output transducers spaced along a flat surface of the bar. The spacing and area of contact of these output transducers can be selected and external connections can be made to produce arbitrary bandpass filter characteristics, as disclosed by Rowen.

*Summary of the invention*

It is an object of this invention to modify the structure of tapped acoustic delay lines to adapt it for use as a universal transversal filter whose response characteristic can be selected at will at the time of final fabrication without any structural changes in the line.

It is another object of this invention to adapt mean-square equalizer techniques to the final fabrication of monolithic transversal equalizers of arbitrary response characteristic.

According to this invention the structure of a tapped acoustic delay line is modified to lay out the output transducers thereon in evenly spaced transverse strips divided into binarily weighted segments and to provide polarized longitudinal summing strips therealong. Further, a tap selection circuit for final connection of tap segments to the summing strips by comparison of the responses of the acoustic delay line and a reference wave filter to identical inputs is made in accordance with mean-square equalizer principles.

In an illustrative embodiment a block of quartz or the like of rectangular cross-section is provided with an input transducer at one end and an acoustic absorber at the other end, along one flat surface a plurality of output transducers comprised of thin transverse conductive strips evenly spaced in a longitudinal direction and divided into binarily weighted segments and a further pair of edge-mounted longitudinal conductive strips, and along the opposite flat surface a conductive ground plane. At final fabrication selected segments of each transverse output transducer are electrically connected to one or the other longitudinal strips so that an algebraic summation of the signals on these longitudinal strips represents the desired arbitrary response.

The selection of tap segments is automatically performed according to a further feature of this invention in a test fixture in which temporary electrical connections are made between each tap segment and longitudinal strip and the outputs of reversible binary counters. The counters are driven by correlators which multiply the overall tap outputs by the difference between the summed outputs taken from the longitudinal strips and the output of a reference wave filter, whose characteristic is to be matched, responsive to identical test signals applied to the input of the ultrasonic delay line and the reference filter.

It is a feature of this invention that an acoustic delay line can be transformed into a monolithic transversal filter of arbitrary response characteristic without any alteration of physical structure.

It is another feature of this invention that final fabrication of a filter of arbitrary response characteristic can be accomplished automatically.

*Description of drawings*

The above and other objects and features of this invention will be appreciated from a consideration of the following detailed description and the drawing in which.

*Detailed description*

Figure 1:
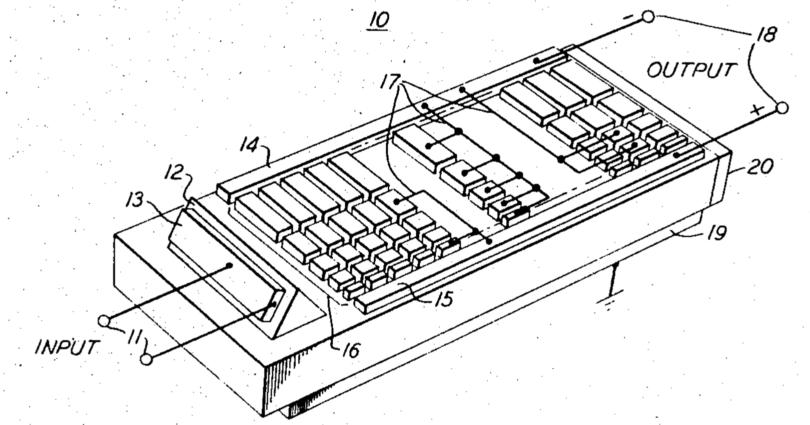
FIG. 1 is a perspective view of an illustrative embodiment of an acoustic delay line having multiple segmented tap outputs according to this invention.

FIG. 1 is a perspective diagram of a tapped acoustic delay line of the type disclosed in the cited Rowen patent and modified in accordance with this invention. Delay line 10 is a rectangularly cross-sectioned bar of any suitable ultrasonic propagation material. There are a number of suitable materials, such as quartz, known to the art. Wedge 12 at the left-hand edge has a ceramic input transducer 13 affixed thereto for launching a wave of acoustic energy into the delay line. Input terminals 11 are provided for electrical connection to wedge 12 and transducer 13. The Rayleigh surface wave induced in the body of the delay line in one transmission mode follows a path adjacent to and substantially parallel to the longitudinal axis of line 10, as more fully explained by Rowen. The right-hand end of line 10 terminates in acoustic absorber 20 in the usual way.

Deposited on the top flat surface of line 10 are a plurality of output electrodes or receivers generally denoted 16. These electrodes are thin, narrow conductive strips each extending transversely across the top surface of line 10 and having a spacing equal to the reciprocal of twice the highest frequency to be transmitted by the line. Each transverse strip is divided into binarily weighted lengths, such as in the ratios of 16, 8, 4, 2 and 1. Running lengthwise along the edges are further narrow conductive strips 14 and 15. All of strips 14, 15 and 16 may be formed by plating the flat surface with a suitable conductive material and etching away the undesired intermediate material. The bottom flat surface of line 10 is plated with a ground electrode 19 with an area coextensive with the region occupied on the top surface by the receiver electrodes. Terminals 18 are provided for longitudinal strips 14 and 15.

In operation, electrical energy applied to wedge 12 is converted into acoustic energy which traverses line 10 at constant velocity. Such energy passes electrodes 16 at evenly spaced intervals of delay and is eventually absorbed in end wall 20. The amount of energy extractible at any electrode 16 is proportional to the area of contact. Thus, selective connection of segments is analogous to attenuating the tapped outputs by increments. By electrically converting certain segments of the several transverse electrodes, as indicated by representative conductors 17, to either edge land 14 or 15, the equivalent circuit for a transversal equalizer is obtained. The necessary summing circuit can then be provided by inverting operational amplifiers either externally of line 10 or by using line 10 as a substrate for an equivalent integrated circuit module.

The delay line of FIG. 1 is intended to be illustrative only. Similar effects can be obtained from piezoelectric and magnetostrictive transducers operating in compressive, shear and torsional modes. Distributed constant resistance-capacitance thin-film circuits are also adaptable to similar purpose.

Figure 2:
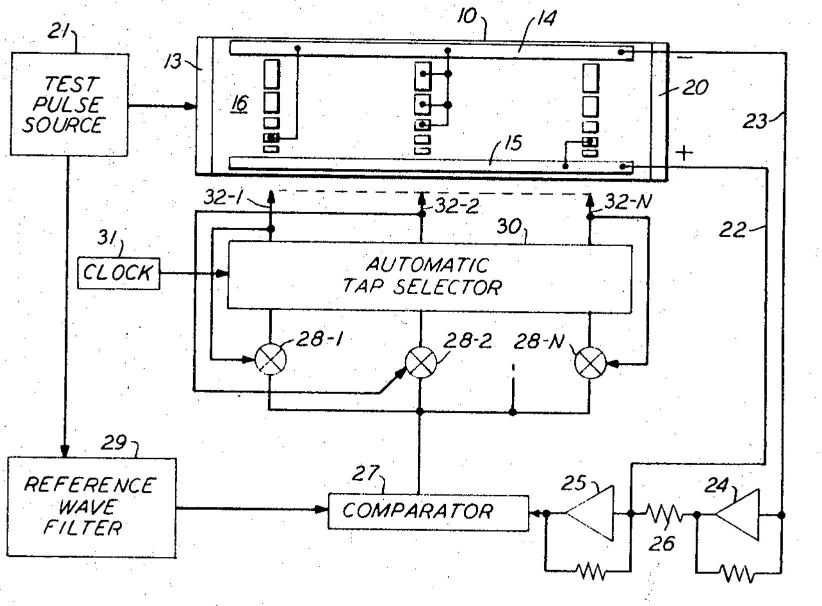
FIG. 2 is a block schematic diagram of a test fixture for selecting tap segments on an acoustic delay line to transform it into a transversal filter of arbitrary response characteristic.

FIG. 2 is a block diagram of an automated test fixture by means of which the tap segments 16 to be connected to the lands 14 and 15 on delay line 10 in FIG. 1 can be selected. This fixture can be located at the end of a production facility for acoustic delay lines constructed according to FIG. 1.

The test fixture arrangement comprises a test pulse source 21, a reference wave filter 29, a signal comparator 27, a plurality of correlators 28, a clock source 31 and an automatic tap selector 30. Tap selector 30 is provided with a plurality of leads 32, which can advantageously include terminal fingers or brush contacts adapted to engage lands 14 and 15 and each segment of each transverse output electrode 16. Leads 22 and 23 similarly contact lands 14 and 15 in the arrangement. The lower ends of leads 22 and 23 are connected to the inputs of tandem operational amplifiers 25 and 24, respectively. These amplifiers include feedback resistors as shown to provide virtually zero input impedance as is well known. Resistor 26 permits the output of amplifier 24 to be summed at the input of amplifier 25 with the signal on lead 22. The output of amplifier 25 furnishes another input to comparator 27.

Correlators 28 are product modulators which multiply the difference signal from comparator 27 with the polarities of the signals at each tap on the delay line being adjusted. Clock 31 generates a triggering wave at some arbitrary low frequency to control the rate at which tap changes are made during the adjustment procedure.

Reference wave filter 29 is used as the standard to which a given delay line is to be matched. It may be an R-L-C or a digital filter.

In operation test pulses from test source 21 traverse both the delay line 10 under adjustment and reference filter 29. Tap selector 30 will be at some initial state which couples some tap segments to positive land 15 and some to negative land 14. As the signal progresses down the line under adjustment, the summed output from lands 14 and 15 in operational amplifiers 24 and 25 changes continuously. At the same time the output of reference filter 29 changes. The difference between the summed output of line 10 and that of filter 29 as derived in comparator 27 changes accordingly. This difference is the error signal to be reduced to a minimum. The error signal is applied in common to all correlators 28–1 through 28–N. Each of these correlators has another individual input from the taps 16 on line 10 as shown. The product output of each correlator 28 controls an up-down counter in tap selector 30. Each of these counters advances or retards by one count per clock pulse, thereby changing the tap segment connections to lands 14 and 15 by one incremental step in a direction tending to reduce the magnitude of the error signal from comparator 27. The output of clock 31 determines the instant at which these tap changes are made.

With each successive one of a series of impulses from source 21 a new tap change is made, until at some time the tap changes settle down to a random walk back and forth about settings that produce the minimum root-mean-square error signal. In accordance with the number of segments allotted to each transverse electrode and the number of such electrodes on line 10, the response characteristic of line 10 can be made to match that of reference filter 29 to any desired degree of accuracy. The final connections for the tap segments to lands 14 and 15 can be read from the counters and the actual connections made manually. In the alternative, automatic apparatus for making these connections can be designed by known integrated circuit manufacturing techniques.

Figure 3:
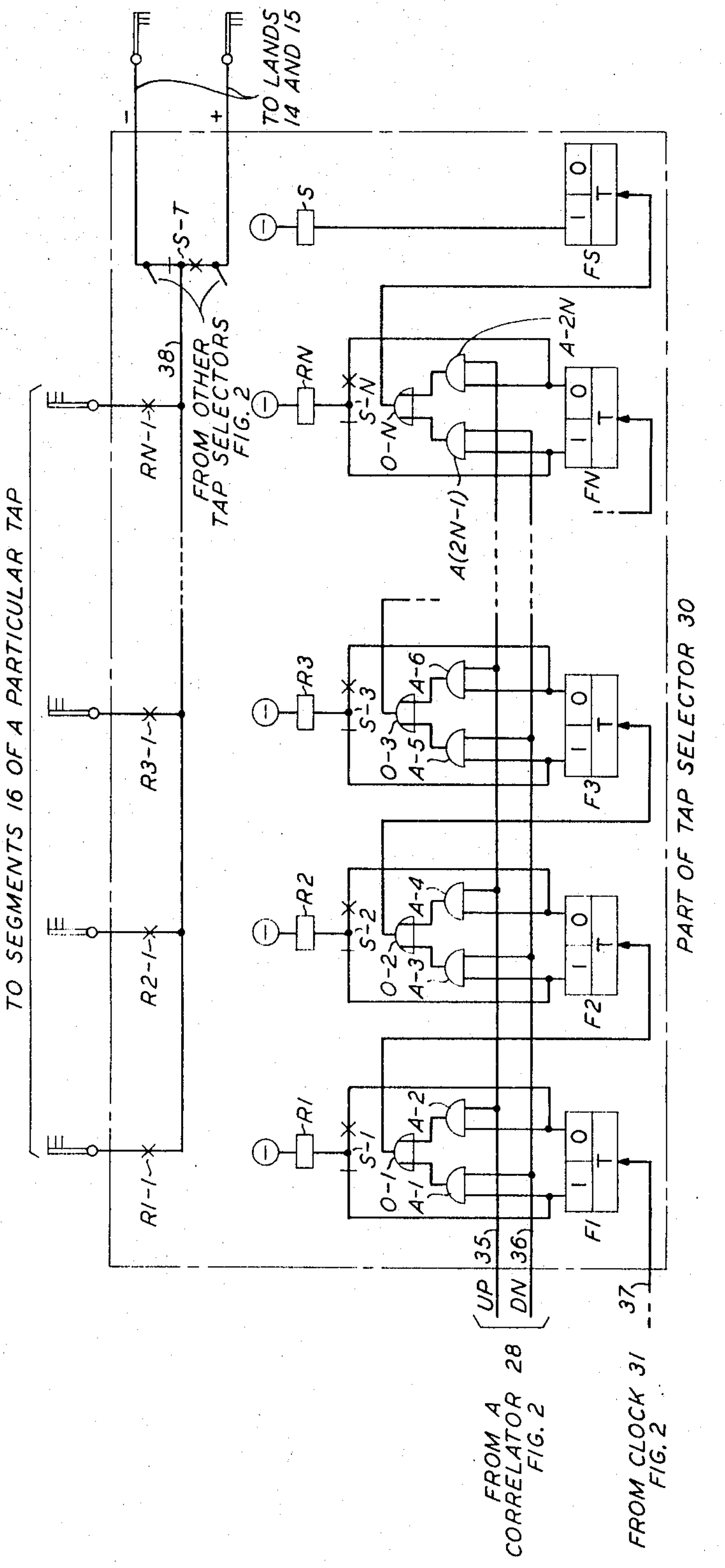
FIG. 3 is a block schematic diagram of a reversible binary counter useful in the practice of this invention.

FIG. 3 is a block schematic diagram of an embodiment of a reversible binary counter useful in the practice of this invention. FIG. 3 represents the part of automatic tap selector 30 associated with an individual transverse receiver electrode 16 on delay line 10. The portion of FIG. 3 within the broken lines comprises an (N+1)-stage reversible binary counter, where N is the number of segments chosen for the individual transverse electrode; interstage logic means controlled by the outputs of correlators 28 to determine the direction of the count; a plurality N of relays R controlling the connection of the tap segments to a bus 38; and an additional relay S controlling the alternative connection of bus 38 to lands 14 and 15. Common bus 38 provides a connection through relay make-contacts R1–1 to RN–1 and transfer contacts S–T to the individual tap segments and lands 14 and 15 in the test fixture. The actual terminations of the several leads indicated as making contact with segments 16 and lands 14 and 15 may advantageously be by means of brushes or wipers. All the brushes shown in FIG. 3 make up a single bundle of leads more generally designated in FIG. 1 as 32–1, 32–2 and 32–N. A complete tap selector 30 includes the components shown in FIG. 3 duplicated for each segmented tap on delay line 10.

The multistage counter conventionally comprises bistable stages F1 through FN and FS. Eech stage has a toggle input T and complementary outputs "1" and "0". An input of the correct polarity at input T complements the previous output. The input to stage F1 is taken from clock source 31 over lead 37. The outputs of stages F1 through FN are gated selectively under the control of signals on up-down count leads 35 and 36 from correlators 28 through AND-gates A–1 through A–2N as shown and OR-gates 0–1 through 0–N to the T inputs of the next higher order stages. For example, a signal on UP-lead 35 completes a connection from the "0" outputs of lower stages to the T input of higher stages to effect an advancing count. Conversely, a signal on DN-lead 36 completes a connection of the "1" output of lower stages to the T input of higher stages to effect a retarding count. The highest order stage FS indicates the algebraic sign of the count standing in the other stages. The outputs of stages F–1 through F–N control associated relays R–1 through R–N through transfer contacts S–1 through S–N. Relays R are also connected to negative batteries as shown in FIG. 3. Relays R control the connections of tap segments to bus 38. Stage FS operates relay S on its "1" lead. Relay S controls the connection of bus 38 to one or the other of lands 14 and 15.

Assuming that contacts R1–1 through RN–1 are connected to progressively larger tap segments and counter stage FN carries the most significant count, the operation of the tap selector of FIG. 3 can be explained as follows. With all stages including FS initially at the "0" state no relays R1 through RN or S will be operated. Bus 38 will not be electrically connected to any tap segment and no tap output will be connected to either of lands 14 or 15. Bus 38 will be connected to land 14, however, through the break-portion of transfer contact S–T. With a signal on UP-lead 35 stage F1 counts one unit at the next clock input on lead 37. Relay R1 immediately operates to close contact R1–1 and the smallest tap segment is connected to bus 38 and negative land 14. On the next clock pulse stage F1 toggles to "0" and relay F1 releases. However, stage F2 toggles to the "1" state and relay R2 operates in place of relay R1. The two-unit tap segment is now connected to bus 38 and negative land 14. On the next clock pulse stages F1 and F2 are both in the "1" state and both relays R1 and R2 are operated to connect three units of tap segments to bus 38. On successive clock pulses tap segments are incrementally connected to bus 38 until all are thus connected.

Should the correlator signal transfer to DN-lead 36 the counter would reverse its count, thereby reducing the unit-value of tap segments connected to bus 38.

Assume that when the counter stages are in the all-zero state DN-lead 36 carries the significant control signal. In this case the next clock signal toggles stage F1 to the "1" state as before but now the interstage logic connects the "1" outputs of lower stages to the T inputs of higher stages. The "1" count will be propagated through all stages including sign stage FS. Relay S operates to close bus 38 to positive land 15 and transfer all relays R1 through RN to the "0" outputs of stages F1 through FN through the make-portion of transfer contacts S–1 through S–N. All relays R1 through RN will be released and no tap segment will be connected to bus 38.

At the next clock pulse stage F1 changes to the "0" state and relay R1 operates to connect the one-unit tap segment to bus 38. However, bus 38 is now connected to positive land 15. Incrementally increasing unit values of tap segments are successively connected to positive land 15 as the clock advances. When the optimum number of tap segments is connected to the appropriate land, successive correlator outputs will change and the UP and DN leads 35 and 36 will oscillate back and forth.

Indicator lamps may be connected to auxiliary contacts (not shown) on relays R1 through RN and S to be interpreted when the final tap selections are complete.

The following Table I summarizes the operation of FIG. 3 for a four-stage counter. Columns S and R4 through R1 represent the relays so denoted in FIG. 3. Columns +Land and —Land indicate connections of bus 38 to the designated land. The column headed Tap Units indicates the number of tap segments of an electrode 16 connected to bus 38. A "1" entry denotes the operation of the indicated relay or a connection to the indicated land. A "0" entry denotes the inverse.

TABLE I

| S | R4 | R3 | R2 | R1 | +Land | —Land | Tap units |
|---|---|---|---|---|---|---|---|
| 1 | 1 | 1 | 1 | 1 | 1 | 0 | 15 |
| 1 | 1 | 1 | 1 | 0 | 1 | 0 | 14 |
| 1 | 1 | 1 | 0 | 1 | 1 | 0 | 13 |
| 1 | 1 | 1 | 0 | 0 | 1 | 0 | 12 |
| 1 | 0 | 1 | 0 | 0 | 1 | 0 | 4 |
| 1 | 0 | 0 | 1 | 1 | 1 | 0 | 3 |
| 1 | 0 | 0 | 1 | 1 | 1 | 0 | 2 |
| 1 | 0 | 0 | 0 | 0 | 1 | 0 | 1 |
| 1 | 0 | 0 | 0 | 0 | 1 | 0 | 0 |
| 0 | 0 | 0 | 0 | 0 | 0 | 1 | 0 |
| 0 | 0 | 0 | 0 | 0 | 0 | 1 | 1 |
| 0 | 0 | 0 | 1 | 1 | 0 | 1 | 2 |
| 0 | 0 | 0 | 1 | 1 | 0 | 1 | 3 |
| 0 | 0 | 1 | 0 | 0 | 0 | 1 | 4 |
| 0 | 1 | 1 | 0 | 0 | 0 | 1 | 12 |
| 0 | 1 | 1 | 0 | 1 | 0 | 1 | 13 |
| 0 | 1 | 1 | 1 | 0 | 0 | 1 | 14 |
| 0 | 1 | 1 | 1 | 1 | 0 | 1 | 15 |

While this invention has been described in terms of a specific embodiment, the principle thereof is susceptible of much wider application within the spirit and scope of the following claims.

What is claimed is:

1. An acoustic delay device adjustable to an arbitrary response characteristic comprising a body of piezoelectric material, input transducer means for launching an acoustic wave within said body, a plurality of spaced transverse conductive members divided into binarily weighted segments affixed to one long surface of said body, a pair of longitudinal conductive members affixed to the outer edges of said one long surface of said body, and means selecting segments of said transverse members to be conductively connected to one or the other of said longitudinal members to cause the algebraic sum of signals on said longitudinal members to match a desired arbitrary response characteristic further comprising
an impulse signal source,
a reference wave filter having the desired arbitrary response characteristic,
means connecting said signal source to said input transducer and to said reference filter,
means combining signals appearing on said longitudinal members algebraically,
means deriving a difference signal from simultaneous outputs of said reference filter and said combining means,
a plurality of reversible binary counting means one for each said transverse member and making connections between segments of said transverse members and said longitudinal members according to the binary count standing therein,
means correlating signals on said individual transverse members with said difference signal,
clock means toggling said plurality of counting means, and
means jointly responsive to said correlating means and said clock means incrementally altering the count in said counting means.

2. Apparatus for adjusting a tapped acoustic delay line having each tap divided into binarily weighted segments and a pair of conductive lands selectively connectible to the tap segments to effect an arbitrary preselected transfer characteristic comprising
means combining signals occurring on the respective lands in opposite polarity,
a reference network having the preselected transfer characteristic,
means transmitting a train of impulses through said delay line and filter,
means taking the difference in outputs from said filter and said combining means due to each of said impulses,
means correlating said difference with the output of each tap on said delay line consecutively, and
reversible counter means controlling the connections between individual tap segments and said lands responsive to said correlating means in such a way as to minimize said difference.

3. In combination with an acoustic delay device having an input transducer and a plurality of output transducers divided into individual binarily weighted segments and spaced at uniform delay intervals affixed to a body of piezoelectric material
means for selecting individual segments of said output transducers to be connected to a common output point to effect an arbitrary input-output transfer characteristic for said device comprising
a plurality of reversible binary counters,
a pair of respective positive and negative summing buses,
means controlled by the count standing in said counters selectively interconnecting said individual segments to said buses,
means combining signals appearing on said buses algebraically,
a test pulse source,
a reference wave filter,
means connecting said pulse source to the input transducer of said device and to said filter,
means obtaining an error signal from the difference in outputs of said combining means and said filter,
a plurality of correlating means jointly responsive to signals from said output transducers and to said error signal,
means controlled by said correlating means determining the counting direction of said binary counters, and
clock means controlling the rate at which said counters operate.

4. The combination of claim 3 in which said summing buses are conductive strips longitudinally affixed to said delay device.

5. The combination of claim 3 in which the said binary counters comprise a plurality of bistable stages each having a toggling input and complementary outputs,
the stage storing the most significant digit indicating the positive or negative polarity of the standing count,
a plurality of electromagnetic relays having contacts in series between individual segments of said output transducers and said summing buses controlled by the complementary outputs of said stages other than that storing the most significant digit, and
a further relay controlled by the output of said most significant stage having transfer contacts between said buses and the contacts of said plurality of relays and between the complementary outputs of said plurality of stages and said plurality of relays.

6. The combination of claim 3 in which said selective interconnecting means comprise electromagnetic relays.

7. The combination of claim 3 in which said means determining the counting direction of said counting means comprises
a pair of logical AND-gates having a first input connected to a complementary output of each stage of said binary counter and a second input connected to said correlating means,
a logical OR-gate having inputs connected to outputs of each pair of said AND-gates and an output connected to the toggle input of the next higher order stage of said binary counter.

8. The combination of claim 3 in which said signal combining means comprises
a tandem-connected pair of operational amplifiers,
a first input to the first of said amplifiers for said negative bus, and
a second input to the second of said amplifiers for said positive bus.

9. The combination of claim 8 in which said operational amplifiers are integrated circuits affixed to said delay device.

References Cited

UNITED STATES PATENTS

| | | | |
|---|---|---|---|
| 2,416,338 | 2/1947 | Mason | 333—30 X |
| 3,289,114 | 11/1966 | Rowen | 333—30 |

OTHER REFERENCES

White et al., Direct Piezoelectric Coupling To Surface Elastic Waves, Applied Physics Letters, Dec. 15, 1965, pp. 314–316.

HERMAN KARL SAALBACH, *Primary Examiner.*

PAUL L. GENSLER, *Assistant Examiner.*

U.S. Cl. X.R.

310—9.8; 333—30, 72